US008062991B2

(12) United States Patent
Male et al.

(10) Patent No.: US 8,062,991 B2
(45) Date of Patent: Nov. 22, 2011

(54) CATALYST SYSTEM AND METHOD FOR THE REDUCTION OF $NO_x$

(75) Inventors: Jonathan Lloyd Male, Schoharie, NY (US); Grigorii Lev Soloveichik, Latham, NY (US); Alison Liana Palmatier, Porter Corners, NY (US); Dan Hancu, Clifton Park, NY (US); Gregory Lee Warner, Schenectady, NY (US); Jennifer Kathleen Redline, Schenectady, NY (US); Eric George Budesheim, Wynantskill, NY (US); Teresa Grocela Rocha, Clifton Park, NY (US); Stanlee Teresa Buddle, Gloversville, NY (US)

(73) Assignee: General Electric Company, Niskayuna, NY (US)

( * ) Notice: Subject to any disclaimer, the term of this patent is extended or adjusted under 35 U.S.C. 154(b) by 1311 days.

(21) Appl. No.: 11/022,897

(22) Filed: Dec. 22, 2004

(65) Prior Publication Data
US 2006/0133976 A1 Jun. 22, 2006

(51) Int. Cl.
*B01J 27/047* (2006.01)
*B01J 27/051* (2006.01)
*B01J 23/00* (2006.01)
*B01J 23/32* (2006.01)

(52) U.S. Cl. ........ 502/300; 502/219; 502/220; 502/311; 502/313; 502/314; 502/324

(58) Field of Classification Search .................. 502/300, 502/311, 313, 314, 321, 219, 220, 324
See application file for complete search history.

(56) References Cited

U.S. PATENT DOCUMENTS

| | | | | | |
|---|---|---|---|---|---|
| 3,498,927 | A | * | 3/1970 | Stiles | 502/237 |
| 5,238,890 | A | * | 8/1993 | Hayasaka et al. | 502/61 |
| 5,772,973 | A | | 6/1998 | Yoshida et al. | |
| 5,955,046 | A | * | 9/1999 | Okimura et al. | 423/239.1 |
| 6,342,191 | B1 | * | 1/2002 | Kepner et al. | 423/210 |
| 6,703,343 | B2 | | 3/2004 | Park | |
| 6,706,660 | B2 | | 3/2004 | Park | |
| 2003/0118960 | A1 | * | 6/2003 | Balmer-Millar et al. | 431/146 |
| 2005/0135980 | A1 | * | 6/2005 | Park et al. | 423/239.1 |

FOREIGN PATENT DOCUMENTS

| | | | |
|---|---|---|---|
| EP | 0577438 A2 | | 1/1994 |
| EP | 577438 A2 | * | 1/1994 |
| EP | 0697240 | | 3/1996 |
| JP | 1119513 | | 1/1999 |
| WO | WO 00/59600 | * | 10/2000 |
| WO | WO0059600 A1 | | 10/2000 |

OTHER PUBLICATIONS

F. C. Meunier, R. Ukropec, C. Stapleton, J. R. Ross, "Effect of the Silver loading and some other experimental parameters on the selective reduction of NO with C3H6 over Al2O3 and ZrO2-based catalysts", Applied Catalysis B: Environmental, 30 (1-2) (2001) pp. 163-172.

M .Haneda, Y. Kintaichi, T. Mizushima, N. Kakuta, H. Hamada, "Structure of Ga2O3-Al2O3 prepared by sol-gel method and its catalytic performance for NO reduction by propene in the presence of oxygen", Applied Catalysis B: Environmental, 31(2) (2001) pp. 81-92.

M. Haneda, Y. Kintaichi, H. Hamada, "Effect of SO2 on the catalytic activity of Ga2O3-Al2O3 for the selective reduction of NO with propene in the presence of oxygen", Applied Catalysis B: Environmental, 31(4), pp. 251-261.

T.N.Angelidis, N. Kruse, "Promotional Effect of SO2 on the selective catalytic reduction of NOx with propane/propene over Ag/gamma-Al2O3", Applied Catalysis B: Environmental, 34(3) (2001) pp. 201-212.

T.N.Angelidis, S. Christoforou, A. Bongiovanni, N. Kruse, "On the promotion of the SCR process over Ag/gamma-Al2O3: influence of SO2 concentration with C3H6 versus C3H8 as reductant", Applied Catalysis B: Environmental, 39(3) (2002) pp. 197-204.

T.Yoshinari, K. Sato, M. Haneda, Y. Kintaichi, H. Hamada, "Positive effect of coexisting SO2 on the activity of supported iridium catalysts for NO reduction in the presence of oxygen", Applied Catalysis B: Environmental, 41(1-2) (2003) pp. 157-169.

* cited by examiner

*Primary Examiner* — Patricia L Hailey
(74) *Attorney, Agent, or Firm* — Richard A. DeCristofaro

(57) ABSTRACT

A catalyst system for the reduction of $NO_x$ comprises a catalyst comprising a metal oxide catalyst support, a catalytic metal oxide comprising at least one of gallium oxide or silver oxide, and at least one promoting metal selected from the group consisting of silver, cobalt, molybdenum, tungsten, indium, bismuth and mixtures thereof. The catalyst system further comprises a gas stream comprising an organic reductant, and a compound comprising sulfur. A method for reducing $NO_x$ utilizing the said catalyst system is also provided.

16 Claims, No Drawings

CATALYST SYSTEM AND METHOD FOR THE REDUCTION OF $NO_x$

BACKGROUND OF THE INVENTION

This invention relates generally to a catalyst system and method for the reduction of nitrogen oxide emissions and more particularly to a catalyst system that comprises a multi-component catalyst, a reductant and a compound comprising sulfur.

Methods have long been sought to reduce the deleterious effects of air pollution caused by byproducts resulting from the imperfect high-temperature combustion of organic materials. When combustion occurs in the presence of excess air and at high temperatures, harmful byproducts, such as nitrogen oxides, commonly known as $NO_x$ are created. $NO_x$ and subsequent derivatives have been suggested to play a major role in the formation of ground-level ozone that is associated with asthma and other respiratory ailments. $NO_x$ also contributes to soot formation, which is linked to a number of serious health effects, as well as to acid rain and the deterioration of coastal estuaries. As a result, $NO_x$ emissions are subject to many regulatory provisions limiting the amount of $NO_x$ that may be present in effluent gas vented into the surrounding environment.

One known method for dealing with $NO_x$ involves the use of selective catalytic reduction (SCR) to reduce $NO_x$ to nitrogen gas ($N_2$) using ammonia ($NH_3$) as a reductant. However, as ammonia's own hazardous consequences are well known, the use of $NH_3$ in an SCR system presents additional environmental and other problems that must also be addressed. As regulatory agencies continue to drive limits on $NO_x$ emission lower, other regulations are also driving down the permissible levels of $NH_3$ that may be emitted into the atmosphere. Because of regulatory limits on ammonia slip, the use of hydrocarbons and their oxygen derivatives for $NO_x$ reduction in a SCR process is very attractive. Numerous catalysts have been suggested for this purpose including zeolites, perovskites, and metals on metal oxide catalyst support. However, existing catalyst systems have either low activity or narrow region of working temperatures or low stability to water, which are detrimental to practical use. Furthermore catalysts active in $NO_x$ reduction are very sensitive to sulfur and lose their activity when sulfur is present in the system. For example, U.S. Pat. No. 6,703,343 teaches catalyst systems for use in $NO_x$ reduction. However, these catalyst systems require a specially synthesized metal oxide catalyst support with very low level of impurities. In addition, these catalyst systems are specifically sensitive to sulfur poisoning. Therefore there is a need for an effective catalyst system to reduce $NO_x$ emissions, which system is stable, operates at a wide range of temperatures, and operates effectively in the presence of sulfur.

BRIEF DESCRIPTION OF THE INVENTION

The present inventors have identified catalyst systems which exhibit surprisingly improved effectiveness in the presence of compounds comprising sulfur. In addition these catalyst systems may be made using commercially available metal oxide catalyst supports with common impurities present. Thus, in one embodiment the present invention is a catalyst system for the reduction of $NO_x$, which catalyst system comprises a catalyst comprising a metal oxide catalyst support, a catalytic metal oxide comprising at least one of gallium oxide or silver oxide and a promoting metal selected from the group consisting of silver, cobalt, molybdenum, tungsten, indium, bismuth and mixtures thereof. The catalyst system further comprises a gas stream comprising an organic reductant, and a compound comprising sulfur.

In another embodiment the present invention is a catalyst system for the reduction of $NO_x$, which catalyst system comprises a catalyst comprising (i) a metal oxide catalyst support comprising alumina, (ii) a catalytic metal oxide comprising at least one of gallium oxide or silver oxide in the range of from about 1 mole % to about 31 mole % and (iii) a promoting metal or combination of promoting metals selected from the group consisting of silver, cobalt, molybdenum, tungsten, indium, bismuth, indium and tungsten, silver and cobalt, indium and molybdenum, indium and silver, bismuth and silver, bismuth and indium, and molybdenum and silver in the range of from about 1 mole % to about 31 mole %. The catalyst system further comprises a gas stream comprising (A) water in the range of from about 1 mole % to about 15 mole %; (B) oxygen gas in the range of from about 1 mole % to about 15 mole %; and (C) an organic reductant selected from the group consisting of an alkane, an alkene, an alcohol, an ether, an ester, a carboxylic acid, an aldehyde, a ketone, a carbonate and combinations thereof; and an oxide of sulfur. The organic reductant and the $NO_x$ are present in a carbon:$NO_x$ molar ratio from about 0.5:1 to about 24:1.

In yet another embodiment the present invention is a method for reducing $NO_x$ comprising the steps of providing a gas mixture comprising $NO_x$, an organic reductant and a compound comprising sulfur; and contacting the gas mixture with a catalyst, wherein the catalyst comprises a metal oxide catalyst support, a catalytic metal oxide comprising gallium oxide or silver oxide; and at least one promoting metal selected from the group consisting of silver, cobalt, molybdenum, tungsten, indium, and bismuth.

In yet another embodiment the present invention is method for reducing $NO_x$ comprising: providing a gas mixture comprising (A) $NO_x$; (B) water in the range of from about 1 mole % to about 15 mole %; (C) oxygen in the range of from about 1 mole % to about 15 mole %; (D) an organic reductant selected from the group consisting of an alkane, an alkene, an alcohol, an ether, an ester, a carboxylic acid, an aldehyde, a ketone, a carbonate and combinations thereof; and (E) an oxide of sulfur; and contacting said gas mixture with a catalyst comprising (i) a metal oxide catalyst support comprising at least one of alumina, titania, zirconia, silicon carbide, or ceria; (ii) a catalytic metal oxide present in an amount in a range of from about 1 mole % to about 31 mole % and comprising at least one of gallium oxide or silver oxide; and (iii) a promoting metal or combination of promoting metals present in an amount in a range of from about 1 mole % to about 31 mole % and selected from the group consisting of silver, cobalt, molybdenum, tungsten, indium, bismuth, indium and tungsten, silver and cobalt, indium and molybdenum, indium and silver, bismuth and silver, bismuth and indium, and molybdenum and silver; wherein said organic reductant and said $NO_x$ are present in a carbon:$NO_x$ molar ratio from about 0.5:1 to about 24:1; and wherein said contact is performed at a temperature in a range of from about 100° C. to about 600° C. and at a space velocity in a range of from about 5000 $hr^{-1}$ to about 100000 $hr^{-1}$.

Various other features, aspects, and advantages of the present invention will become more apparent with reference to the following description and appended claims.

DETAILED DESCRIPTION OF THE INVENTION

In the following specification and the claims which follow, reference will be made to a number of terms which shall be defined to have the following meanings. The singular forms "a", "an" and "the" include plural referents unless the context clearly dictates otherwise.

In one embodiment the present invention comprises a catalyst system for the selective reduction of $NO_x$, which catalyst system comprises a catalyst, a reductant and a compound comprising sulfur. The catalyst comprises a metal oxide catalyst support, a catalytic metal oxide, and at least one promoting metal. The reductant comprises an organic compound. The catalysts systems disclosed herein work effectively in the presence of sulfur.

The metal oxide catalyst support may comprise alumina, titania, zirconia, ceria, silicon carbide or any mixture of these materials. Typically, the metal oxide catalyst support comprises gamma-alumina with high surface area comprising impurities of at least about 0.2% by weight in one embodiment and at least about 0.3% by weight impurities in another embodiment. The metal oxide catalyst support may be made by any method known to those of skill in the art, such as co-precipitation, spray drying and sol-gel methods for example.

The catalyst also comprises a catalytic metal oxide. In one embodiment the catalytic metal oxide comprises gallium oxide. In a particular embodiment the catalyst comprises from about 5 mole % to about 31 mole % of gallium oxide. In another particular embodiment the catalyst comprises from about 12 mole % to about 31 mole % of gallium oxide. In still another particular embodiment the catalyst comprises from about 18 mole % to about 31 mole % of gallium oxide, wherein in all cases mole percent is determined by dividing the number of moles of catalytic metal by the total number of moles of the metal components in the catalyst, including the catalyst support and any promoting metal present. In another embodiment the catalytic metal oxide comprises silver oxide. In another particular embodiment the catalyst comprises from about 0.5 mole % to about 31 mole % of silver oxide. In another particular embodiment the catalyst comprises from about 1 mole % to about 8 mole % of silver oxide. In still another particular embodiment the catalyst comprises from about 1 mole % to about 5 mole % of silver oxide, wherein in all cases mole percent is determined by dividing the number of moles of catalytic metal by the total number of moles of the metal components in the catalyst, including the metal components of the catalyst support and any promoting metal present.

The catalyst also comprises at least one promoting metal. The promoting metal may comprise at least one of silver, cobalt, molybdenum, bismuth, tungsten or indium. Additionally, the promoting metal may also be a combination of more than one of these metals. The catalyst typically comprises from about 1 mole % to about 31 mole % of the promoting metal. In some embodiments the catalyst comprises from about 1 mole % to about 15 mole % of the promoting metal. In some other embodiments the catalyst comprises from about 1 mole % to about 9 mole % of the promoting metal. In one particular embodiment the catalyst comprises from about 1 mole % to about 5 mole % of the promoting metal. It should be appreciated that the term "promoting metal" is meant to encompass elemental metals, metal oxides or salts of the promoting metal, such as $Co_2O_3$ for example. In one particular embodiment wherein the catalytic metal oxide comprises silver oxide, the catalyst system must further comprise at least one promoting metal which is selected from the group consisting of cobalt, molybdenum, tungsten, indium, bismuth and mixtures thereof.

The catalysts may be produced by an incipient wetness technique, comprising the application of homogenous and premixed precursor solutions for catalytic metal oxide and promoting metal contacted with the metal oxide catalyst support. The metal oxide particles for the catalyst support are calcined before application of precursor solution. In some embodiments a primary drying step at about 80° C. to about 120° C. for about 1-2 hours is followed by the main calcination process. The calcination may be carried out at a temperature in the range of from about 500° C. to about 800° C. In some embodiments the calcination is carried out at a temperature in a range of from about 650° C. to about 725° C. In some embodiments the calcination is done for about 2 hours to about 10 hours. In some other embodiments the calcination is done for about 4 hours to about 8 hours. The particles are sifted to collect and use those which are from about 0.1 to about 1000 micrometers in diameter. In one embodiment the particle size ranges from about 2 micrometers to about 50 micrometers in diameter. Based on the surface area and total pore volume of the metal oxide catalyst support particles, the desired loading of the catalyst may then be calculated. As will be appreciated by those of ordinary skill in the art, the surface area and porosity may be up to about 20-30% lower in the final catalyst product, as a result of catalyst loading. The loading of the catalyst is determined by the total pore volume of the support, which is the volume of metal precursors that can be loaded by incipient wetness. The precursor loading is chosen such that the amount of metal is typically less than a monolayer of the active metal oxide on the metal oxide catalyst support. In some embodiments twice the pore volume is used as the total volume of precursor to load, and the metal loading is taken in the range of from about 1 millimole to about 5 millimoles of the mixture of catalytic metal oxide and promoting metal per gram of metal oxide catalyst support.

In the subsequent steps of preparing the catalyst, precursor solutions of the catalytic metal oxide and one or more promoting metals may be prepared. Precursor solutions may be prepared in aqueous media, in hydrophilic organic media, or in a mixture thereof. Hydrophilic organic media comprise carboxylic acids, alcohols and mixtures thereof, such as, but not limited to, acetic acid or ethanol. The solutions are typically made by mixing solvent with metal salts, such as, but not limited to, metal nitrates, citrates, oxalates, acetylacetonates, molybdates, or benzoates, in an amount to create a solution of appropriate molarity based on the desired catalyst composition. In some embodiments the metal salt is a molybdenum heteropoly anion or ammonium molybdate. The methods used for preparing the catalyst system are known in the art and include depositing metal oxide catalyst support in a honeycomb support in a wash coating method or extruding in a slurry into a desired form. The purity of the metal precursors for both catalytic metal oxide and promoting metal is in the range of from about 95% to about 99.999% by weight. In one embodiment all the metal precursors are mixed together and are as homogeneous as possible prior to addition to the metal oxide catalyst support. In some other embodiments different metal precursors are added sequentially to the metal oxide catalyst support. In one embodiment the desired volume of the precursor solution is added to coat the metal oxide catalyst support and create a catalyst with the desired final catalyst loading. Once the metal salt solution or solutions have been added to the metal oxide catalyst support, the catalyst may optionally be left to stand for a period of time, in some embodiments about 6 to 10 hours. The catalyst is then dried for a period of time at a desired temperature. In a particular embodiment the catalyst may be dried under a vacuum, optionally while a nitrogen stream is passed over the mixture. Finally, the catalyst may be calcined at a desired temperature and for a desired time to create the final catalyst product.

Catalysts according to exemplary embodiments of the present invention may be created using either a manual or an automated process. Typically, a manual process is used for the preparation of catalysts of a larger mass, such as about 1 to about 20 grams (g) for example. An automated process is typically used when the catalysts are of a smaller mass, such as about 5 milligrams (mg) to about 100 mg, for example. Generally, manual and automated processes for preparation of the catalyst are similar with the exception that an automated process involves automated measuring and dispensing of the precursor solutions to the metal oxide catalyst support.

In some embodiments the organic reductants for use in the catalyst system of exemplary embodiments of the present invention comprise hydrocarbons that are fluid, either as a liquid or gas, such that they may flow through the catalyst when introduced into an effluent gas stream for use in a catalyst system for the reduction of $NO_x$. Typically, hydrocarbons of less than about 16 carbon atoms will be fluid, although hydrocarbons with higher numbers of carbon atoms may also be fluid, for example, depending on the chemical structure and temperature of the gas stream. The hydrocarbons may be any type of hydrocarbon, including, for example, alkanes and alkenes whether straight chain, branched or cyclical. The organic reductant may comprise hydrocarbons that are all of the same type or it may contain a mixture of different hydrocarbons. Further, the mixture may be a mixture of hydrocarbons all having the same number of carbon atoms such as octane, octene and 1,3-dimethyl-cyclohexane, for example. Likewise, the mixture may be a mixture of hydrocarbons having different numbers of carbon atoms such as hexane and butane, for example. One particularly suitable mixture of hydrocarbons for use as a reductant in the catalyst system in various embodiments of the invention is gasoline. As will be appreciated by those of skill in the art, gasoline typically comprises a mixture of linear and branched hydrocarbons, with a majority of the hydrocarbons having between about 5 and about 12 carbon atoms. In other embodiments the organic reductant comprises a hydrocarbon comprising oxygen. In some particular embodiments the catalyst system comprises an organic reductant selected from the group consisting of an alkane, an alkene, an alcohol, an ether, an ester, a carboxylic acid, an aldehyde, a ketone, a carbonate and combinations thereof. In some embodiments the organic reductant comprises a compound with at least one functional group selected from the group consisting of hydroxy, alkoxy, carbonyl, carbonate and combinations thereof. Some non-limiting examples of suitable organic reductants comprise hexane, propane, ethane, 2,2,4-trimethyl pentane, octane, propene, ethene, methanol, ethyl alcohol, 1-butanol, 2-butanol, 1-propanol, iso-propanol, dimethyl ether, dimethyl carbonate, acetaldehyde, acetone and combinations thereof.

The catalyst system also comprises a compound comprising sulfur. In some embodiments the compound comprising sulfur is present in the gas stream comprising $NO_x$, for example, in an exhaust gas from a combustion source. In other embodiments the compound comprising sulfur is added to the gas stream comprising the reductant before or after or at the same time as combination with the $NO_x$ gas stream. In still other embodiments the compound comprising sulfur is present in the gas stream comprising $NO_x$ and is also added to the gas stream comprising the reductant before or after or at the same time as combination with the $NO_x$ gas stream. The amount of compound comprising sulfur present in the gas stream is in one embodiment in a range of between about 0.1 ppm and about 50 ppm, and in another embodiment in a range of between about 0.1 ppm and about 20 ppm. In still other embodiments the catalyst is pre-treated with the compound comprising sulfur. In some other embodiments the compound comprising sulfur is present in the gas stream comprising $NO_x$ or is added to the gas stream comprising the reductant either before or after or at the same time as combination with the $NO_x$ gas stream, and the catalyst is also pre-treated with the compound comprising sulfur. The pre-treatment of the catalyst with the compound comprising sulfur is typically done by exposing the catalyst to a gas mixture comprising the compound comprising sulfur. In various embodiments the compound comprising sulfur is selected from the group consisting of an oxide of sulfur, a mercaptan and combinations thereof. In one embodiment, the compound comprising sulfur comprises sulfur dioxide.

The catalyst system may be used in conjunction with any process or system in which it may be desirable to reduce $NO_x$ emissions, such as a gas turbine; a steam turbine; a boiler; a locomotive; or a transportation exhaust system, such as, but not limited to, a diesel exhaust system. The catalyst system may also be used in conjunction with systems involving generating gases from burning coal, burning volatile organic compounds (VOC), or in the burning of plastics; or in silica plants, or in nitric acid plants. The catalyst is typically placed at a location within an exhaust system where it will be exposed to effluent gas comprising $NO_x$. The catalyst may be arranged as a packed or fluidized bed reactor, coated on a monolithic, foam, mesh or membrane structure, or arranged in any other manner within the exhaust system such that the catalyst is in contact with the effluent gas. Since the catalyst systems disclosed herein work effectively in the presence of sulfur, they can be used advantageously in removing $NO_x$ from effluent gases from a engine which uses diesel as a fuel since diesel fuel has a high sulfur content. Similarly the catalyst systems can work advantageously with other fuels having high sulfur content.

As will be appreciated by those ordinarily skilled in the art, although catalytic reactions are generally complex and involve many steps, the overall basic selective catalytic reduction reaction process for the reduction of $NO_x$ is believed to occur as follows:

$$NO_x + O_2 + \text{organic reductant} \rightarrow N_2 + CO_2 + H_2O \quad (1)$$

The effluent gas stream usually comprises air, water, CO, $CO_2$, $NO_x$, and may also comprise other impurities. Additionally, uncombusted or incompletely combusted fuel may also be present in the effluent gas stream. The organic reductant is typically fed into the effluent gas stream to form a gas mixture, which is then fed through the catalyst. Sufficient oxygen to support the $NO_x$ reduction reaction may already be present in the effluent gas stream. If the oxygen present in the gas mixture is not sufficient for the $NO_x$ reduction reaction, additional oxygen gas may also be introduced into the effluent gas stream in the form of oxygen or air. In some embodiments the gas stream comprises from about 1 mole % to about 21 mole % of oxygen gas. In some other embodiments the gas stream comprises from about 1 mole % to about 15 mole % of oxygen gas.

One advantage of embodiments of the present invention is that the reduction reaction may take place in "reductant lean" conditions. That is, the amount of reductant added to the effluent gas to reduce the $NO_x$ is generally low. Reducing the amount of reductant to convert the $NO_x$ to nitrogen may provide for a more efficient process that has decreased raw material costs. The molar ratio of reductant to $NO_x$ is typically in a range of from about 0.25:1 to about 6:1. In other embodiments the ratio is typically such that the ratio of carbon atoms in the reductant is about 0.5 to about 24 moles per mole of $NO_x$. In some other embodiments the organic reductant and the $NO_x$ are present in a carbon:$NO_x$ molar ratio in a range of from about 0.5:1 to about 15:1. In a particular embodiment the organic reductant and the $NO_x$ are present in a carbon:$NO_x$ molar ratio in a range of from about 0.5:1 to about 8:1.

The reduction reaction may take place over a range of temperatures. Typically, the temperature may range in one embodiment from about 100° C. to about 600° C., in another embodiment from about 200° C. to about 500° C., and in still another embodiment from about 350° C. to about 450° C.

The reduction reaction may take place under conditions wherein the gas mixture is configured to have a space velocity in one embodiment in a range of from about 5000 reciprocal hours ($hr^{-1}$) to about 100000 $hr^{-1}$, in another embodiment in a range of from about 8000 $hr^{-1}$ to about 50000 $hr^{-1}$, and in still another embodiment in a range of from about 8000 $hr^{-1}$ to about 40000 $hr^{-1}$.

Exemplary embodiments of the catalyst system may also advantageously be used in wet conditions. In particular embodiments $NO_x$ reduction accomplished using exemplary embodiments of the present invention may be effective in effluent gas streams comprising water. In some embodiments the gas stream comprises from about 1 mole % to about 15 mole % of water and in some other embodiments from about 2 mole % to about 10 mole % of water.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

EXAMPLES

Catalysts were prepared and used in combination with reductants in accordance with exemplary embodiments of the invention. The conversion of the $NO_x$ was analyzed over a variety of experimental conditions, including varying catalyst compositions, reductants, reaction temperatures, and reductant to $NO_x$ ratios.

In the following examples catalyst samples were prepared each having a gamma-alumina catalyst support commercially available from Saint-Gobain NorPro of Stow, Ohio. The alumina catalyst support had a purity of 99.5% to 99.7%. The alumina support was first calcined at 725° C. for 6 hours in presence of an oxidant. The oxidant may be air or an oxidant gas comprising about 1% to about 21% of oxygen in nitrogen. The alumina particles were then sifted to collect the catalyst support having a particle size diameter of from about 450 micrometers to about 1000 micrometers, unless otherwise stated. Prior to loading, the catalyst support had a surface area of about 240 square meters per gram ($m^2$/g) and a pore volume of 0.796 milliliters per gram (mL/g).

Gallium or silver was used as the metal for the catalytic metal oxide added to the alumina. The metal was added in a soluble form to wet the alumina support and was made either from a solution of gallium nitrate having the formula $Ga(NO_3)_3 \cdot 6H_2O$, or from a solution of silver nitrate. For example, the solution was made by combining deionized water with gallium nitrate having a purity of 99.999% (metals basis) obtained from Alfa-Aesar of Ward Hill, Mass. Millipore water having a resistivity of 18 megaohm-centimeters was employed in all operations. For the promoting metal, an aqueous solution of the nitrate salt of the desired metal(s) also having a purity of 99.999% (metals basis) and obtained from Alfa-Aesar was added to the alumina support. All the metal precursors were mixed together and were as homogeneous as possible prior to addition to the alumina support. The catalysts were left to stand for 6 to 10 hours and were then dried under a dynamic vacuum with a nitrogen influx for 4 to 5 hours at 80° C. Finally, the dried catalyst was heat treated. The heat profile for this treatment began with an increase from 25° C. to 110° C. at 1.4° C. per minute. The catalyst was held at 110° C. for 1.5 hours, after which the temperature was ramped at 5° C. per minute to a value of 650° C. The catalyst was held 6 hours at this temperature and then allowed to cool over a period of about 4 to 6 hours.

Catalysts were tested in a 32-tube high-throughput heterogeneous catalyst-screening micro-reactor, unless noted otherwise. The reactor was a heated, common headspace gas distribution manifold that distributed a reactant stream equally via matched capillaries to parallel reactor tubes. The manifold had heated capabilities, allowing pre-heating of the reactant stream and vaporization of liquid reactants prior to distribution. The entire heated manifold assembly was mounted on a vertical translation stage, raised and lowered via pneumatic pressure. Reactor tubes were inserted in a gold-coated 10 centimeter (cm) thick insulated copper reactor block (dimension 13.5 cm×25 cm), which was electrically heated to vary temperature between 200° C. to 650° C.

Chemically inert KALREZ™ o-rings available from DuPont of Wilmington, Del., served as viscoelastic end-seals on either end of each reactor tube. Reactor tubes were made of INCONEL 600™ tubing with 0.635 cm outside diameter and 0.457 cm internal diameter, available from Inco Alloys/Special Metals of Saddle Brook, N.J. The tubes were free to slide vertically through the gold-coated copper heating block. Each tube contained a quartz wool frit, on which the catalyst samples of about 0.050 g were placed in the center of each of the tubes through which a reactant stream of a blended gas mixture comprising $NO_x$ and reductant simulating an effluent gas stream was passed. A single bypass tube was used to ensure equal flow through each of the 32 testing tubes. The fittings were connected to a distribution manifold for delivery of the blended gas mixture. The components of the blended gas mixture were fed to a common mixing manifold using electronic mass flow controllers, and then routed to the distribution manifold. The pressure in the distribution manifold was maintained at about 275.8 kilopascals (kPa). Reactor temperature and flow control were fully automated.

Once loaded in the tubes, the catalysts were heat-treated under airflow as described herein above and then reacted with the blended gas mixture. The reactor effluent was sent to heated sampling valves that selected tubes in series and fed the continuous stream to a chemiluminescent analyzer. Any stream that was not routed to the analytical device was routed to a common vent.

The switching valves for routing gases were computer controlled and actuated in a pre-determined time-based sequence. The chemiluminescent analyzer was connected to a computer-based data-logging system. Data corresponding to reactor tube effluent composition were time-stamped and stored. Data from the bypass tube were also stored as a reference to the inlet composition of the catalyst reactor tubes. This permitted the combination of data to determine activity and selectivity of each catalyst sample.

For $NO_x$ reduction testing the reactant stream of the blended gas mixture comprised reductant, about 200 ppm $NO_x$, 12% by volume oxygen, 7% by volume water and the balance nitrogen and optionally a sulfur-comprising compound. In embodiments of the invention the $NO_x$ reduction was tested in presence of a compound comprising sulfur, for example $SO_2$. In some examples $SO_2$ was blended with the gas mixture comprising reductant and in some other examples the catalyst itself was pretreated with $SO_2$ before the experiment. The type and amount of reductant in the stream varied depending on the experiments being conducted. The flow rate of the blended gas mixture through each of the tubes was 29 standard cubic centimeters per minute (sccm) per tube.

Table 1 shows the compositions of the catalyst samples prepared, with compositions expressed in mole percent of each promoting metal and/or catalytic metal present in the catalyst. The balance of the composition was alumina from the alumina catalyst support. Mole percent was determined for each component by dividing the number of moles of that component by the total number of moles of the metal components in the catalyst, including the metal components of the metal oxide catalyst support. The abbreviation "C.Ex." means Comparative Example.

TABLE 1

| Example | Ga | In | Ag | Co | W |
|---|---|---|---|---|---|
| C. Ex. 1 | 29 | 0 | 0 | 0 | 0 |
| C. Ex. 2 | 0 | 0 | 2 | 0 | 0 |
| Ex. 1 | 27 | 2 | 0 | 0 | 0 |
| Ex. 2 | 27 | 0 | 0 | 0 | 2 |
| Ex. 3 | 25 | 0 | 0 | 0 | 4 |
| Ex. 4 | 20 | 0 | 0 | 0 | 8 |
| Ex. 5 | 21 | 3 | 0 | 0 | 3 |
| Ex. 6 | 22 | 3 | 0 | 0 | 3 |
| Ex. 7 | 21 | 6 | 0 | 0 | 1 |
| Ex. 8 | 27 | 0 | 2 | 0 | 0 |
| Ex. 9 | 25 | 0 | 2 | 2 | 0 |
| Ex. 10 | 27 | 0 | 0 | 2 | 0 |
| Ex. 11 | 22 | 3 | 0 | 3 | 0 |

A first set of experiments was conducted in which various catalyst samples were prepared and tested with various reductants using the described testing procedure at 450° C. The results in Table 2 show the percentage of $NO_x$ converted for each of the catalyst systems. The example numbers in Table 2 correspond to the catalyst compositions in the examples of Table 1. Although the molar ratio of reductant to $NO_x$ varied with the reductant used, the molar ratio of carbon:$NO_x$ was generally equal to about 6:1 for each of the experimental systems. The abbreviations "DME" and "IPA" mean dimethyl ether and iso-propyl alcohol. In all the examples listed in Table 2, the gas mixture comprising the reductant comprised 5 ppm of $SO_2$.

TABLE 2

| | Reductants | | | | | |
|---|---|---|---|---|---|---|
| Example | MeOH | DME | EtOH | Acetaldehyde | Acetone | IPA |
| C. Ex. 1 | 66 | 33 | 45 | 44 | 46 | 68 |
| C. Ex. 2 | 14 | 4 | 71 | 65 | 59 | 86 |
| Ex. 1 | 33 | 14 | 48 | 38 | 37 | 69 |
| Ex. 2 | 76 | 68 | 27 | 37 | 45 | 35 |
| Ex. 3 | 42 | 17 | 18 | 30 | 37 | 31 |
| Ex. 4 | 56 | 26 | 28 | 32 | 37 | 37 |
| Ex. 5 | 21 | 9 | 49 | 43 | 47 | 69 |
| Ex. 6 | 23 | 12 | 44 | 39 | 40 | 70 |
| Ex. 7 | 17 | 14 | 30 | 31 | 36 | 42 |
| Ex. 8 | 16 | 6 | 65 | 75 | 62 | 90 |
| Ex. 9 | 15 | 5 | 70 | 71 | 60 | 80 |
| Ex. 10 | 53 | 8 | 26 | 25 | 22 | 65 |
| Ex. 11 | 20 | — | 17 | — | — | 48 |

As shown in Table 2, Example 2 having a combination of gallium oxide as the catalytic metal oxide and tungsten as the promoting metal showed particularly good results using reductants such as methanol and DME. Example 8 comprising gallium and silver and example 9 comprising gallium, cobalt and silver both showed good performance with ethanol, acetaldehyde, acetone and IPA.

A second set of experiments was conducted in which various catalyst samples were prepared and tested with various reductants using the described testing procedure at 450° C. The results in Table 3 show the percentage of $NO_x$ converted for each of the catalyst systems. Most of the catalysts as shown in Table 3 comprised molybdenum. The abbreviation "C.Ex." means Comparative Example. Comparative example 3 consists only of the alumina support. Although the molar ratio of reductant to $NO_x$ varied with the reductant used, the molar ratio of carbon:$NO_x$ was generally equal to about 6:1 for each of the experimental systems. In all the examples listed in Table 3, the gas mixture comprising the reductant comprised 5 ppm of $SO_2$.

TABLE 3

| | Catalyst | | | Reductant | | | | | |
|---|---|---|---|---|---|---|---|---|---|
| Example | Composition | | | | | Acetaldehyde | | | |
| | Ga | In | Mo | MeOH | DME | | EtOH | IPA | Acetone |
| C. Ex. 3 | 0 | 0 | 0 | 28 | 15 | 11 | 10 | 14 | 10 |
| Ex. 12 | 20 | 0 | 8 | 40 | 19 | 30 | 34 | 49 | 21 |
| Ex. 13 | 22 | 3 | 3 | 28 | 15 | 23 | 35 | 43 | 19 |
| Ex. 14 | 24 | 0 | 5 | 79 | 27 | 46 | 55 | 81 | 45 |
| Ex. 15 | 25 | 2 | 0 | 33 | 14 | 38 | 48 | 69 | 37 |
| Ex. 16 | 26 | 0 | 0 | 53 | 8 | 25 | 26 | 65 | 22 |
| Ex. 17 | 27 | 0 | 2 | 68 | 35 | 43 | 47 | 72 | 29 |
| Ex. 18 | 27 | 2 | 0 | 24 | 7 | 39 | 48 | 65 | 45 |
| Ex. 19 | 21 | 6 | 1 | 5 | — | — | 15 | 22 | — |

As shown in Table 3, Examples 14 and 17 having a combination of gallium oxide as the catalytic metal oxide and molybdenum as the promoting metal showed good results using reductants such as methanol and IPA.

A third set of experiments was conducted in which various catalyst samples were prepared and tested with n-octane as reductant using the described testing procedure at 400° C. The results in Table 4 show the percentage of $NO_x$ converted for each of the catalyst systems. All the catalysts as shown in Table 4 comprised silver. Although the molar ratio of reductant to $NO_x$ varied with the reductant used, the molar ratio of carbon:$NO_x$ was generally equal to about 6:1 for each of the experimental systems. In all the examples listed in Table 4, the gas mixture comprised 600 ppm of n-octane. In the last two columns of data, the catalyst was pre-treated with $SO_2$. The pre-treatment of each catalyst with $SO_2$ was done by keeping the catalyst exposed to a gas mixture comprising 5 ppm of $SO_2$ at 400° C. for 16 hours. In this set of experiments each example consisted of 3 runs under 3 different conditions. In the first condition the fresh catalyst was contacted with a gas mixture which did not contain any $SO_2$. In the second condition the same catalyst was pretreated with a gas mixture comprising $SO_2$ and then contacted with a gas mixture which did not contain any $SO_2$. In the third condition the same catalyst was pretreated with $SO_2$ and then contacted with a gas mixture comprising 1 ppm $SO_2$. Each catalyst generally showed better performance in condition 2 and 3 compared to condition 1.

TABLE 4

| | Catalyst Composition | | | SO$_2$ Content in the stream (ppm) | | |
|---|---|---|---|---|---|---|
| | | | | Condition 1 0 | Condition 2 0 | Condition 3 1 Cat. pretreated with SO$_2$ |
| Example | Ga | In | Ag | Percentage of NO$_x$ converted | | |
| C. Ex. 4 | 0 | 0 | 2 | 77 | 95 | 95 |
| Ex. 20 | 27 | 0 | 2 | 98 | 98 | 98 |
| Ex. 21 | 25 | 2 | 2 | 97 | 96 | 96 |
| Ex. 22 | 22 | 3 | 3 | 40 | 86 | 89 |
| Ex. 23 | 25 | 0 | 4 | 17 | 84 | 86 |
| Ex. 24 | 20 | 4 | 4 | 2 | 47 | 51 |
| C. Ex. 5 | 0 | 0 | 5 | 18 | 88 | 89 |
| Ex. 25 | 22 | 1 | 6 | 0 | 26 | 35 |
| Ex. 26 | 20 | 0 | 9 | 7 | 23 | 28 |
| Ex. 27 | 0 | 0 | 29 | 48 | 35 | 23 |

A fourth set of experiments was conducted in which various catalyst samples were prepared and tested with IPA as reductant using the described testing procedure at 450° C. The results in Table 5 show the percentage of NO$_x$ converted for each of the catalyst systems. All the catalysts as shown in Table 5 comprised silver. Although the molar ratio of reductant to NO$_x$ varied with the reductant used, the molar ratio of carbon:NO$_x$ was generally equal to about 6:1 for each of the experimental systems. In the last two columns of data, the catalyst was pre-treated with SO$_2$. The pre-treatment of each catalyst with SO$_2$ was done by the method described in the previous section. In this set of experiments each example consisted of 3 runs in 3 different conditions In the first condition the fresh catalyst was contacted with the gas mixture did not contain any SO$_2$. In the second condition the same catalyst was pretreated with a gas mixture comprising SO$_2$ and then contacted with a gas mixture which did not contain any SO$_2$. In the third condition the same catalyst was pretreated with SO$_2$ and then contacted with a gas mixture comprising 1 ppm SO$_2$. The amount of SO$_2$ as listed in row 3 has a superscript a or b. Superscript "a" signifies that the gas mixture used for those experiments comprised 150 ppm IPA and superscript "b" signifies that the gas mixture comprised 400 ppm IPA. Each catalyst showed better performance in condition 2 and 3 compared to condition 1.

TABLE 5

| | Catalyst Composition | | | SO$_2$ Content in the stream (ppm) | | |
|---|---|---|---|---|---|---|
| | | | | Condition 1 0[b] | Condition 2 0[b] | Condition 3 1[b] Pretreated with SO$_2$ |
| Example | Ga | In | Ag | Percentage of NO$_x$ converted | | |
| C. Ex. 6 | 0 | 0 | 2 | 7 | 12 | 80 |
| Ex. 28 | 27 | 0 | 2 | 4 | 25 | 90 |
| Ex. 29 | 25 | 2 | 2 | 5 | 18 | 80 |
| Ex. 30 | 22 | 3 | 3 | 3 | 7 | 49 |
| Ex. 31 | 25 | 0 | 4 | 3 | 9 | 60 |
| Ex. 32 | 20 | 4 | 4 | 4 | 7 | 38 |
| Ex. 33 | 22 | 1 | 6 | 3 | 7 | 33 |
| Ex. 34 | 20 | 0 | 9 | 2 | 13 | 22 |
| C. Ex. 7 | 0 | 0 | 29 | 2 | 14 | 18 |

A fifth set of experiments was conducted in which various reductants were tested at 450° C. in the presence or absence of SO$_2$ in the gas mixture. These experiments were performed with a catalyst comprising 27% Ga and 2% Ag. Although the molar ratio of reductant to NO$_x$ varied with the reductant used, the molar ratio of carbon:NO$_x$ was generally equal to about 6:1 for each of the experimental systems. The results in Table 6 show the percentage of NO$_x$ converted for each of the catalyst systems. The abbreviation "2,2,4-TMP" means 2,2,4-trimethylpentane.

TABLE 6

| Reductant | 0 ppm SO$_2$ | 5 ppm SO$_2$ |
|---|---|---|
| C$_3$H$_6$ | 63 | 69 |
| EtOH | 26 | 65 |
| PrOH | 17 | 90 |
| 2,2,4-TMP | 72 | 70 |
| Hexane | 28 | 45 |

A sixth set of experiments was conducted in which various reductants were tested at 450° C. in the presence or absence of SO$_2$ in the gas mixture. These experiments were performed with a catalyst comprising 24% Ga and 5% Mo. Although the molar ratio of reductant to NO$_x$ varied with the reductant used, the molar ratio of carbon:NO$_x$ was generally equal to about 6:1 for each of the experimental systems. The results in Table 7 show the percentage of NO$_x$ converted for each of the catalyst systems. The abbreviation "2,2,4-TMP" means 2,2,4-trimethylpentane.

TABLE 7

| Reductant | 0 ppm SO$_2$ | 5 ppm SO$_2$ |
|---|---|---|
| MeOH | 7 | 78 |
| EtOH | 55 | 55 |
| PrOH | 53 | 80 |
| C$_3$H$_6$ | 45 | 64 |
| 2,2,4-TMP | 23 | 65 |
| Hexane | 30 | 30 |
| Octane | 51 | 40 |

A seventh set of experiments was conducted in a 96-tube reactor in which methanol and dimethylether were tested as reductants at 400° C. in presence of a gas mixture comprising 5 ppm of SO$_2$, 1000 ppm NO$_x$, 2% water, and 13% O$_2$ and the balance helium at a nominal space velocity of 13,000 hr$^{-1}$. The catalyst compositions along with the catalyst activity for each experiment are given in Table 8. The balance of moles catalyst comprises the metal oxide catalyst support, which in these experiments had an average particle size of 20 micrometers. Although the molar ratio of reductant to NO$_x$ varied with the reductant used, the molar ratio of carbon:NO$_x$ was generally equal to about 6:1 for each of the experimental systems. The catalyst activity is expressed in moles of NO$_x$ converted to N$_2$ per gram of catalyst per hour. The nitrogen was directly detected by gas chromatography.

TABLE 8

| | Catalyst | | | | Reductant | |
|---|---|---|---|---|---|---|
| Example | Bi | In | Ag | Ga | MeOH | DME |
| Ex. 35 | 0 | 17 | 12 | 0 | 0.0016 | 0.0017 |
| Ex. 36 | 0 | 17 | 0 | 12 | 0.0014 | 0.0016 |
| Ex. 37 | 0 | 12 | 6 | 12 | 0.00051 | 0.00079 |
| Ex. 38 | 0 | 6 | 6 | 17 | 0.00036 | 0.00051 |
| Ex. 39 | 4 | 0 | 6 | 13 | 0.00033 | 0.00047 |
| Ex. 40 | 0 | 0 | 12 | 17 | 0.00026 | 0.00041 |
| Ex. 41 | 2 | 0 | 12 | 12 | 0.00019 | 0.00035 |
| Ex. 42 | 2 | 12 | 12 | 0 | 0.00015 | 0.00031 |
| Ex. 43 | 0 | 23 | 0 | 6 | 0.00015 | 0.00030 |
| Ex. 44 | 0 | 12 | 17 | 0 | 0.00020 | 0.00030 |
| Ex. 45 | 11 | 0 | 0 | 0 | — | 4.1E−05 |

TABLE 8-continued

| Example | Catalyst | | | | Reductant | |
| | Bi | In | Ag | Ga | MeOH | DME |
|---|---|---|---|---|---|---|
| C. Ex. 8 | 0 | 0 | 29 | 0 | — | 1.4E−06 |
| Ex. 46 | 0 | 12 | 12 | 6 | — | 0.00032 |

An eighth set of experiments was conducted in a 96-tube reactor in which propene and ethene were tested as reductants at 400° C. in presence of a gas mixture comprising 5 ppm of $SO_2$, 1000 ppm $NO_x$, 2% water, and 13% $O_2$ and the balance helium at a nominal space velocity of 13,000 hr$^{-1}$. The catalyst compositions along with the catalyst activity for each experiment are given in Table 9. The balance of moles catalyst comprises the metal oxide catalyst support, which in these experiments had an average particle size of 20 micrometers. Although the molar ratio of reductant to $NO_x$ varied with the reductant used, the molar ratio of carbon:$NO_x$ was generally equal to about 6:1 for each of the experimental systems. The catalyst activity is expressed in moles of $NO_x$ converted to $N_2$ per gram of catalyst per hour. The nitrogen was directly detected by gas chromatography.

TABLE 9

| Example | Catalyst | | | | | Reductant | |
| | Bi | Mo | In | Ag | Ga | Propene | Ethene |
|---|---|---|---|---|---|---|---|
| Ex. 47 | 0 | 0 | 12 | 12 | 6 | 0.0016 | — |
| Ex. 48 | 0 | 0 | 6 | 17 | 6 | 0.0012 | — |
| Ex. 49 | 0 | 4 | 0 | 18 | 6 | 0.0011 | — |
| Ex. 50 | 0 | 0 | 17 | 12 | 0 | 0.0011 | — |
| Ex. 51 | 0 | 4 | 12 | 12 | 0 | 0.00098 | — |
| Ex. 52 | 8 | 0 | 0 | 0 | 7 | 0.00097 | — |
| Ex. 53 | 0 | 0 | 6 | 0 | 23 | 0.00096 | — |
| Ex. 54 | 6 | 0 | 0 | 13 | 0 | 0.00094 | — |
| Ex. 55 | 0 | 0 | 0 | 12 | 17 | 0.00094 | — |
| C. Ex. 9 | 0 | 0 | 0 | 0 | 29 | 0.00093 | — |
| Ex. 56 | 0 | 17 | 0 | 6 | 0 | 0.00090 | — |
| Ex. 57 | 0 | 12 | 0 | 6 | 6 | 0.00089 | — |
| Ex. 58 | 0 | 0 | 6 | 6 | 17 | 0.00086 | — |
| Ex. 59 | 0 | 0 | 12 | 6 | 12 | 0.00085 | — |
| Ex. 60 | 0 | 0 | 29 | 0 | 0 | 0.00075 | — |
| C. Ex. 10 | 0 | 0 | 0 | 29 | 0 | 0.00068 | — |
| Ex. 61 | 0 | 0 | 17 | 12 | 0 | — | 0.0021 |
| Ex. 62 | 0 | 0 | 17 | 0 | 12 | — | 0.0017 |
| Ex. 63 | 0 | 0 | 12 | 6 | 12 | — | 0.0010 |
| Ex. 64 | 0 | 0 | 12 | 12 | 6 | — | 0.00076 |
| Ex. 65 | 0 | 0 | 6 | 17 | 6 | — | 0.00075 |
| Ex. 66 | 0 | 0 | 6 | 6 | 17 | — | 0.0064 |
| Ex. 67 | 0 | 0 | 0 | 12 | 17 | — | 0.00063 |
| Ex. 68 | 0 | 0 | 12 | 17 | 0 | — | 0.0059 |
| Ex. 69 | 0 | 0 | 23 | 0 | 6 | — | 0.00055 |
| Ex. 70 | 4 | 0 | 0 | 6 | 13 | — | 0.00052 |
| Ex. 71 | 0 | 0 | 12 | 0 | 17 | — | 0.00035 |
| Ex. 72 | 4 | 0 | 0 | 19 | 0 | — | 0.00034 |
| C. Ex. 11 | 0 | 0 | 0 | 29 | 0 | — | 0.00012 |
| Ex 73 | 11 | 0 | 0 | 0 | 0 | — | 5E−05 |
| Ex 74 | 0 | 0 | 29 | 0 | 0 | — | 1.1E−05 |

A ninth set of experiments was conducted in which methanol was tested as a reductant at 400° C. in presence of a gas mixture comprising 5 ppm of $SO_2$, 200 ppm $NO_x$, 4% water, and 13% $O_2$ and the balance nitrogen at a nominal space velocity of 28,000 hr$^{-1}$. The catalyst compositions along with the catalyst activity for each experiment are given in Table 10. The balance of moles catalyst comprises the metal oxide catalyst support. Although the molar ratio of reductant to $NO_x$ varied with the reductant used, the molar ratio of carbon:$NO_x$ was generally equal to about 6:1 for each of the experimental systems. The catalyst activity is expressed in moles of $NO_x$ converted to $N_2$ per gram of catalyst per hour. Comparative example 12 consists only of the alumina support and gallium oxide.

TABLE 10

| Example | Catalyst | | | | Reductant |
| | Ga | Ag | In | Mo | MeOH |
|---|---|---|---|---|---|
| Ex. 75 | 6 | 6 | 19 | 0 | 1.1E−05 |
| Ex. 76 | 6 | 19 | 6 | 0 | 3.0E−05 |
| Ex. 77 | 6 | 0 | 25 | 0 | 2.1E−05 |
| Ex. 78 | 13 | 6 | 13 | 0 | 0.00014 |
| Ex. 79 | 19 | 6 | 6 | 0 | 1.3E−05 |
| Ex. 80 | 0 | 6 | 25 | 0 | 0.00014 |
| Ex. 81 | 0 | 19 | 13 | 0 | 8.3E−06 |
| Ex. 82 | 29 | 2 | 0 | 0 | 5.1E−06 |
| Ex. 83 | 5 | 16 | 10 | 0 | 2.0E−05 |
| C Ex. 12 | 31 | 0 | 0 | 0 | 3.1E−07 |
| Ex. 84 | 0 | 0 | 13 | 13 | 1.9E−05 |

Various embodiments of this invention have been described in fulfillment of the various needs that the invention meets. It should be recognized that these embodiments are merely illustrative of the principles of various embodiments of the present invention. Numerous modifications and adaptations thereof will be apparent to those skilled in the art without departing from the spirit and scope of the present invention. Thus, it is intended that the present invention cover all suitable modifications and variations as come within the scope of the appended claims and their equivalents.

What is claimed is:

1. A catalyst system for the reduction of $NO_x$ comprising:
 a pretreated catalyst comprising a metal oxide catalyst support, a catalytic metal oxide comprising at least one of gallium oxide or silver oxide, a promoting metal selected from the group consisting of silver, cobalt, molybdenum, tungsten, indium, bismuth and mixtures thereof, and a compound comprising sulfur, wherein said pretreated catalyst is treated with said compound comprising sulfur prior to the catalyst contacting $NO_x$; and
 a gas stream comprising an organic reductant.

2. The catalyst system of claim 1, wherein said metal oxide catalyst support comprises at least one member selected from the group consisting of ceria, silicon carbide, and mixtures thereof.

3. The catalyst system of claim 1, wherein said catalytic metal oxide comprises gallium oxide in a range of from about 5 mole % to about 31 mole %.

4. The catalyst system of claim 1, wherein said catalytic metal oxide comprises silver oxide in the range of from about 0.5 mole % to about 31 mole %.

5. The catalyst system of claim 1, wherein said catalyst comprises said promoting metal in the range of from about 1 mole % to about 31 mole %.

6. The catalyst system of claim 1, wherein the catalytic metal oxide comprises silver oxide and the promoting metal comprises indium.

7. The catalyst system of claim 6, wherein the catalytic metal oxide comprises gallium oxide and the promoting metal comprises the combination of indium and silver.

8. The catalyst system of claim 1, wherein said organic reductant is selected from the group consisting of an alkane, an alkene, an alcohol, an ether, an ester, a carboxylic acid, an aldehyde, a ketone, a carbonate and combinations thereof.

9. The catalyst system of claim 1, wherein said organic reductant is selected from the group consisting of hexane, propane, ethane, 2,2,4-trimethyl pentane, octane, propene, ethane, methanol, ethyl alcohol, butyl alcohol, propyl alcohol, dimethyl ether, dimethyl carbonate, acetaldehyde, acetone and combinations thereof.

10. The catalyst system of claim 1, wherein said organic reductant and said $NO_x$ are present in a carbon:$NO_x$ molar ratio from about 0.5:1 to about 24:1.

11. The catalyst system of claim 1, wherein said gas stream further comprises water in the range of from about 1 mole % to about 15 mole %.

12. The catalyst system of claim 1, wherein said gas stream further comprises oxygen gas in the range of from about 1 mole % to about 21 mole %.

13. The catalyst system of claim 1, wherein said compound comprising sulfur is present in said gas stream comprising $NO_x$ or in the gas stream comprising the reductant or in both gas streams.

14. The catalyst system of claim 1, wherein said compound comprising sulfur is a mercaptan.

15. The catalyst system of claim 1, wherein $NO_x$ is derived from a combustion source comprising at least one of a gas turbine, a boiler, a locomotive, a transportation exhaust system, coal burning, plastics burning, volatile organic compound burning, a silica plant, or a nitric acid plant.

16. A catalyst system for the reduction of $NO_x$ comprising:
a pretreated catalyst comprising (i) a metal oxide catalyst support comprising alumina, (ii) a catalytic metal oxide comprising at least one of gallium oxide or silver oxide in the range of from about 1 mole % to about 31 mole %, (iii) a promoting metal or combination of promoting metals selected from the group consisting of cobalt, molybdenum, tungsten, indium, bismuth, indium and tungsten, silver and cobalt, indium and molybdenum, indium and silver, bismuth and silver, bismuth and indium, and molybdenum and silver in the range of from about 1 mole % to about 31 mole % , and (iv) a compound comprising sulfur, wherein said pretreated catalyst is treated with said compound comprising sulfur prior to the catalyst contacting the $NO_x$; and
a gas stream comprising (A) water in the range of from about 1 mole % to about 15 mole %; (B) oxygen gas in the range of from about 1 mole % to about 15 mole %; and (C) an organic reductant selected from the group consisting of an alkane, an alkene, an alcohol, an ether, an ester, a carboxylic acid, an aldehyde, a ketone, a carbonate and combinations thereof;
wherein said organic reductant and said $NO_x$ are present in a carbon:$NO_x$ molar ratio from about 0.5:1 to about 24:1.

* * * * *